United States Patent [19]

Lewis

[11] Patent Number: 5,025,683

[45] Date of Patent: Jun. 25, 1991

[54] ORIFICE CUP PLUG AND SEAL ASSEMBLY

[75] Inventor: Charles W. Lewis, Wayne, Mich.

[73] Assignee: General Motors Corporation, Detroit, Mich.

[21] Appl. No.: 467,627

[22] Filed: Jan. 19, 1990

[51] Int. Cl.⁵ .................. F16H 57/04; F16L 33/16
[52] U.S. Cl. ................... 74/606 R; 138/44; 285/379
[58] Field of Search ............... 74/606 R, 467, 866, 74/867; 285/379; 138/40, 44, 89; 475/65

[56] References Cited

U.S. PATENT DOCUMENTS

| | | | |
|---|---|---|---|
| 2,053,626 | 9/1936 | Parker | 285/379 |
| 2,244,311 | 6/1941 | Nee et al. | 138/44 |
| 2,585,290 | 2/1952 | Wolker | 138/44 |
| 3,889,780 | 6/1975 | Dison | 74/606 R |
| 3,913,846 | 10/1975 | Morris | 138/44 |
| 4,168,725 | 9/1979 | Astakhov et al. | 138/44 |
| 4,185,665 | 1/1980 | Flimon | 138/89 |
| 4,270,636 | 6/1981 | Sunohara et al. | 475/65 X |
| 4,302,918 | 12/1981 | Rautilo | 138/89 |
| 4,638,689 | 1/1987 | Sakai | 74/866 |

Primary Examiner—Allan D. Herrmann
Assistant Examiner—Winnie Yip
Attorney, Agent, or Firm—Donald F. Scherer

[57] ABSTRACT

A cup plug assembly having a cup plug element with an orifice and an integral seal element for use at the interface of two automatic transmission components clamped together, is self retaining and prevents the seal from being mispositioned during installation. The plug assembly is pressed into one of the two components prior to clamping the two components together.

3 Claims, 1 Drawing Sheet

ORIFICE CUP PLUG AND SEAL ASSEMBLY

TECHNICAL FIELD

This invention relates to plugs for restricting fluid flow through fluid passages in an automatic transmission. The exemplary embodiment described in this disclosure establishes a mechanism which replaces an orifice plate and a seal between a transmission case and a transmission case extension. The mechanism aids in providing a low pressure supply of oil to a yoke to yoke bushing interface in the extension.

BACKGROUND OF THE INVENTION

In automatic transmissions for vehicles, it is common for fluid flow to be restricted by an orifice. Orifice plates and orifice plugs are two common methods of doing this when it is not possible to provide the orifice by drilling or reaming the desired hole diameter into the transmission case. Page 325-4L-17 of the 1982 Buick Regal—Le Sabre—Electra—Riviera Chassis Service Manual shows the procedure for removal of a cup plug from a transmission case where it is part of a lo-reverse overrun clutch circuit.

In this specific application, an orifice plate and a seal have been used between the transmission case and a transmission case extension to restrict the flow of fluid to a yoke bushing. The restriction is necessary to prevent transmission fluid from escaping past a yoke seal to the outside of the transmission. A continued loss of fluid could lead to the eventual loss of transmission line pressure. The restriction is also necessary to maintain the desired rate of transmission fluid flow to other transmission component interfaces. Excess flow of transmission fluid to the yoke bushing would reduce the rate of transmission fluid flow to the other interfaces.

The particular disadvantage of the orifice and seal combination as employed in this system is in the difficulty of assembly. The plate and seal must be dropped into a bore in the transmission case shortly before assembling the transmission case to the transmission case extension. Grease has been used to hold the plate and seal in position during assembly. Even with the use of grease, the parts can fall out of place during assembly. A cup plug with an orifice could be used instead of the plate to overcome the potential mispositioning of the plate, but the seal could still be mispositioned. The seal would be ineffective in preventing fluid leakage between the transmission case and the transmission case extension if mispositioned. Leakage could potentially reduce the flow of oil to the yoke bushing to the point where it may be insufficient to prevent a seizure of the yoke to the yoke bushing.

SUMMARY OF THE INVENTION

This invention eliminates the possibility of the seal and/or the orifice plate being mispositioned after installation by bonding a seal to a plug cup having an orifice. This invention eliminates the need for installing the orifice plate and seal just prior to bolting the extension to the transmission case. The orifice cup plug can be installed at almost any time after finish machining of the case or extension.

It is an object of this invention to provide a cup plug assembly for use at the interface of two automatic transmission components clamped together, the plug assembly to be inserted into one of the two components prior to clamping the two components together, the plug assembly also having a seal means for preventing the loss of fluid between the two clamped components, with a cup plug element having a distended shape and open on a proximal end and closed on a distal end except for the orifice through the distal end, the cup plug element having an interference fit between itself and the transmission component into which it is inserted, and a flange at the proximal end, with a seal means bonded to said flange of said cup plug element.

This and other objects and advantages will be more apparent from the following description and drawings.

DESCRIPTION OF THE PREFERRED EMBODIMENT

The accompanying drawings illustrate one representative form of a transmission cup plug orifice and seal assembly.

Figure 2:
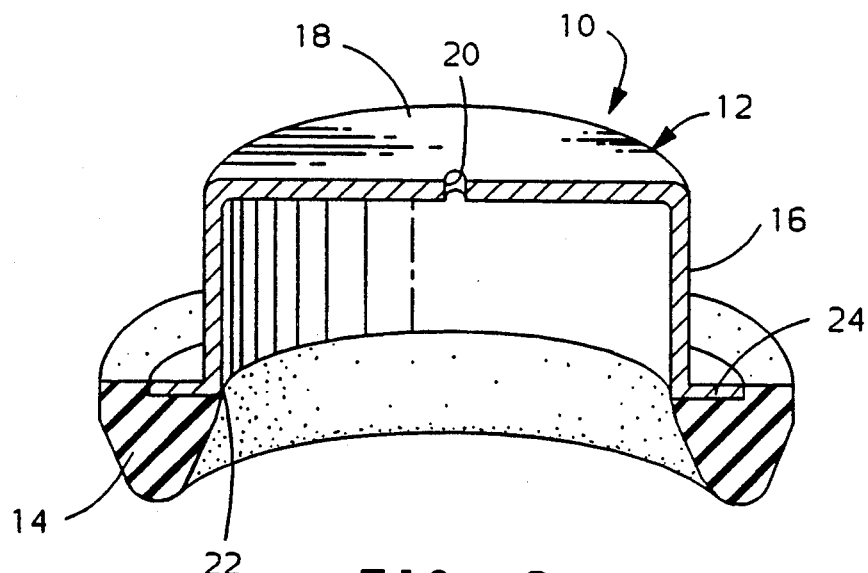
FIG. 2 shows a sectional/perspective view of the plug assembly with the seal in the relaxed position.

FIG. 2 shows an uninstalled plug assembly 10. The plug assembly 10 is comprised of its plug element 12 and its seal element 14. The plug element is a distended, cylindrical shape 16, closed on a distal end 18 except for an orifice 20, and open on a proximal end 22. The proximal end 22 has a radially extending flange 24. The seal element 14 is bonded to the flange 24 of the plug element 12.

Figure 1:
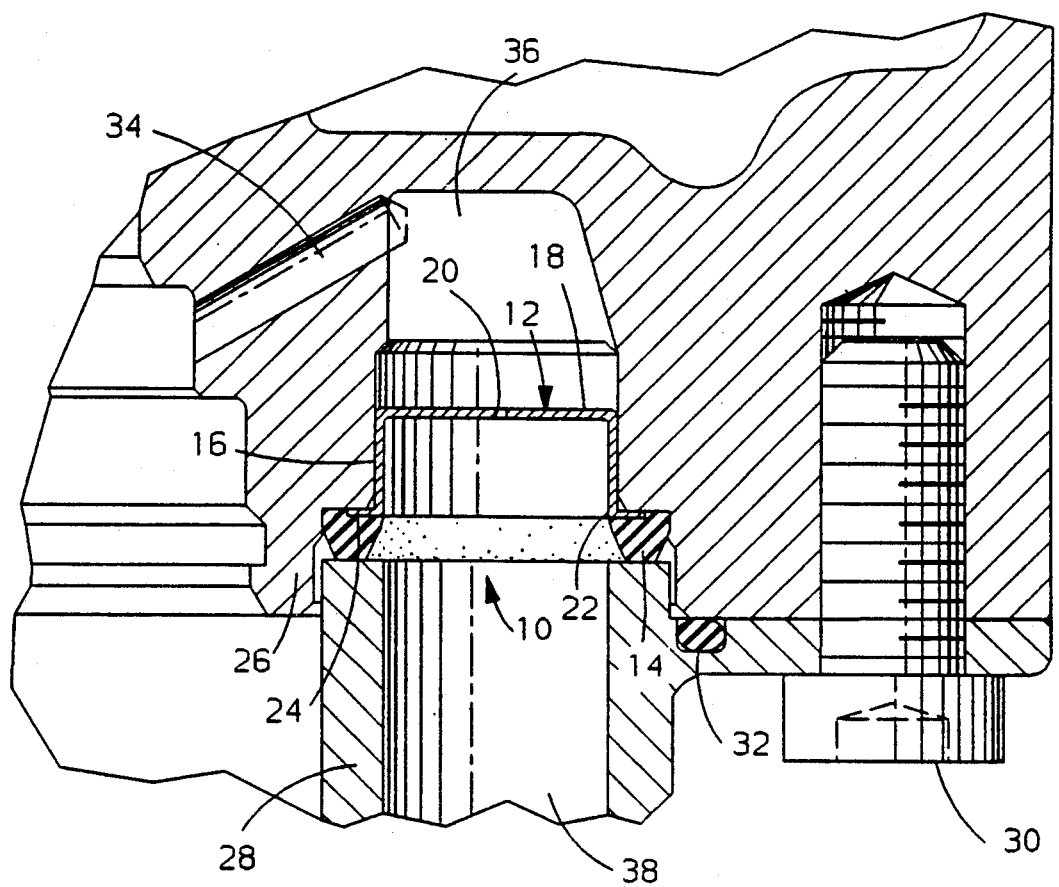
FIG. 1 shows the plug in the installed position.

FIG. 1 shows the plug assembly 10 installed in a transmission case 26 with the seal element 14 contacting both the transmission case 26 and a transmission case extension 28 which is mounted to the case 26. The plug assembly 10 is shown in the transmission case 26, but alternatively could be installed in the transmission case extension 28. The seal element 14 contacts both the transmission case 26, and the transmission case extension 28, and is compressed by a clamping load provided by bolts 30 which are used between the case 26 and the extension 28. An O-ring seal 32 is located between the case 26 and the extension 28 and is also compressed by the clamping load from the bolts 30. The O-ring 32 is intended to prevent leakage of fluid between the transmission case and the transmission case extension 28 to the outside of the transmission. The fluid flow path is through the transmission case passage 34, into the cavity 36, through the orifice 20 and through the transmission case extension passage 38.

The advantage of this device becomes apparent when assembling the transmission case extension 28 to the transmission case 26. The plug assembly 10 is pressed into the transmission case 26. Alternatively, the plug assembly 10 could be pressed into the extension 28 if provisions were made to accommodate the plug assembly 10 there. Because the assembly 10 is self retaining, it can be installed at any time after the case 26 or the extension 28 have been finish machined.

After installing the plug assembly 10, but before mounting the extension 28 to the case 26, the O-ring 32 is positioned in the extension 28. The extension 28 is then bolted to the case 26. The primary advantage is in the increased reliability of the seal between the transmission case 26 and the transmission case extension 28 provided by the plug assembly 10 and the impact that this has on the reliability of the transmission as a whole.

The increased reliability is a direct result of the reduced complexity of installing the orifice and seal.

The plug assembly 10, once installed, functions as part of the fluid control system within the transmission. Fluid passes through a transmission case passage 34 into a cavity 36 at the distal end 18 of the plug 10. The fluid accumulates at the distal end 18 of the plug 10 and gradually passes through the orifice 20 in the distal end 18. The seal element 14 prevents the fluid from passing between the transmission case 26 and the extension 28. The fluid then follows the transmission case extension passage 38 to an opening in a bushing (not shown) through which it passes to reach its destination, the bushing to yoke surface (not shown). Here, it replenishes a film of fluid between the bushing and the yoke.

Obviously, many modifications and variations of the present invention are possible in light of the above teaching. It is therefore to be understood, that within the scope of the appended claims, the invention may be practiced otherwise than as specifically described.

The embodiments of the invention in which an exclusive property or privilege is claimed are defined as follows:

1. A cup plug assembly for use at an interface of two automatic transmission components, a transmission case and a transmission case extension, to be inserted into one of the two components prior to clamping the two components together, comprising:
    a cup plug element with a distended cylindrical shape, open on a proximal end, closed on a distal end except for an orifice through the distal end, having a radially extending flange at the proximal end, the distended shape being sized so the cup plug assembly must be pressed into the transmission component into which the cup plug assembly is inserted to seat the cup plug assembly; and
    a seal element for preventing the loss of fluid between the transmission case and the transmission case extension, bonded to the flange of the cup plug element.

2. A cup plug assembly for use at an interface of two automatic transmission components, a transmission case and a transmission case extension, to be inserted into one of the two components prior to clamping the two components together, comprising:
    a cup plug element with a distended cylindrical shape, open on a proximal end, closed on a distal end except for an orifice through the distal end for restricting fluid flow between the two components, having a radially extending flange at the proximal end, the distended shape being sized to allow insertion of the distal end of the distended shape into an opening in the transmission component, the distended shape increasing in size toward the proximal end, being sized at the proximal end to require pressing the cup plug assembly to seat it in the opening in the transmission component; and
    a seal element for preventing the loss of fluid between the transmission case and the transmission case extension, bonded to the flange of the cup plug element, having a shape which provides a sealing force against both of the clamped components.

3. A cup plug assembly for use at an interface of an automatic transmission case and an automatic transmission case extension, the plug assembly to be inserted into the transmission case prior to bolting the transmission case extension to the transmission case, comprising:
    a cup plug element, with a distended cylindrical shape, open on a proximal end, closed on a distal end except for an orifice through the distal end for restricting fluid flow between the transmission end for restricting fluid flow between the transmission case and the transmission case extension, the distended shaped being sized to allow insertion of the distal end of the distended shape into an opening in the transmission case and tapering to the proximal end sized to require pressing the cup plug assembly to seat it in the opening in the transmission case;
    the orifice sized to provide desired fluid flow;
    a flange, integral with the plug element, extending radially outward from the proximal end of the plug element, forming a surface perpendicular to an axis of distention; and
    a seal element for preventing the loss of fluid between the transmission case and transmission case extension, being bonded to the flange of the cup plug element, and providing a sealing force against both the transmission case and the transmission case extension.

* * * * *